United States Patent
Ohnishi

(10) Patent No.: US 10,484,593 B2
(45) Date of Patent: Nov. 19, 2019

(54) FOCUS DETECTION DEVICE, FOCUS ADJUSTMENT DEVICE AND CAMERA

(71) Applicant: NIKON CORPORATION, Tokyo (JP)

(72) Inventor: Naoyuki Ohnishi, Tokyo (JP)

(73) Assignee: NIKON CORPORATION, Tokyo (JP)

(*) Notice: Subject to any disclaimer, the term of this patent is extended or adjusted under 35 U.S.C. 154(b) by 94 days.

(21) Appl. No.: 15/894,185

(22) Filed: Feb. 12, 2018

(65) Prior Publication Data

US 2018/0167548 A1    Jun. 14, 2018

Related U.S. Application Data

(63) Continuation of application No. 14/395,083, filed as application No. PCT/JP2013/062220 on Apr. 25, 2013, now abandoned.

(30) Foreign Application Priority Data

Apr. 25, 2012 (JP) ................................ 2012-100150
Jul. 17, 2012 (JP) ................................ 2012-158796

(51) Int. Cl.
  *H04N 5/232* (2006.01)
  *G02B 7/34* (2006.01)
  (Continued)

(52) U.S. Cl.
  CPC ........... *H04N 5/23212* (2013.01); *G02B 7/34* (2013.01); *G03B 3/10* (2013.01); *G03B 13/36* (2013.01);
  (Continued)

(58) Field of Classification Search
  CPC ...... G02B 7/346; G02B 7/34; H04N 5/23229; H04N 5/23219; H04N 5/23212;
  (Continued)

(56) References Cited

U.S. PATENT DOCUMENTS 5,519,203 A    5/1996 Kusaka et al.
6,750,437 B2   6/2004 Yamashita et al.
(Continued)

FOREIGN PATENT DOCUMENTS

JP    2910102 B2    6/1999
JP    2006-145632 A    6/2006
(Continued)

OTHER PUBLICATIONS

May 24, 2018 Office Action issued in Chinese Patent Application No. 201380033507.0.
(Continued)

*Primary Examiner* — Pritham D Prabhakher
(74) *Attorney, Agent, or Firm* — Oliff PLC

(57) ABSTRACT

A focus detection device includes: a plurality of micro-lenses at which light fluxes through an image forming optical system enter, disposed in a two-dimensional array pattern; a plurality of light receiving elements disposed in correspondence to each of the plurality of micro-lenses; a focus detection unit that executes a detection of a defocus quantity of the image forming optical system by detecting, based upon outputs from the plurality of light receiving elements, a phase difference of a plurality of light fluxes through different areas of the image forming optical system; and a recognition unit that recognizes, based upon the outputs from the plurality of light receiving elements, characteristics of a subject image formed onto the plurality of light receiving elements via the plurality of micro-lenses, wherein: the focus detection unit detects the defocus quantity through a method optimal for the characteristics of the subject image recognized by the recognition unit.

19 Claims, 12 Drawing Sheets

Figure 1:
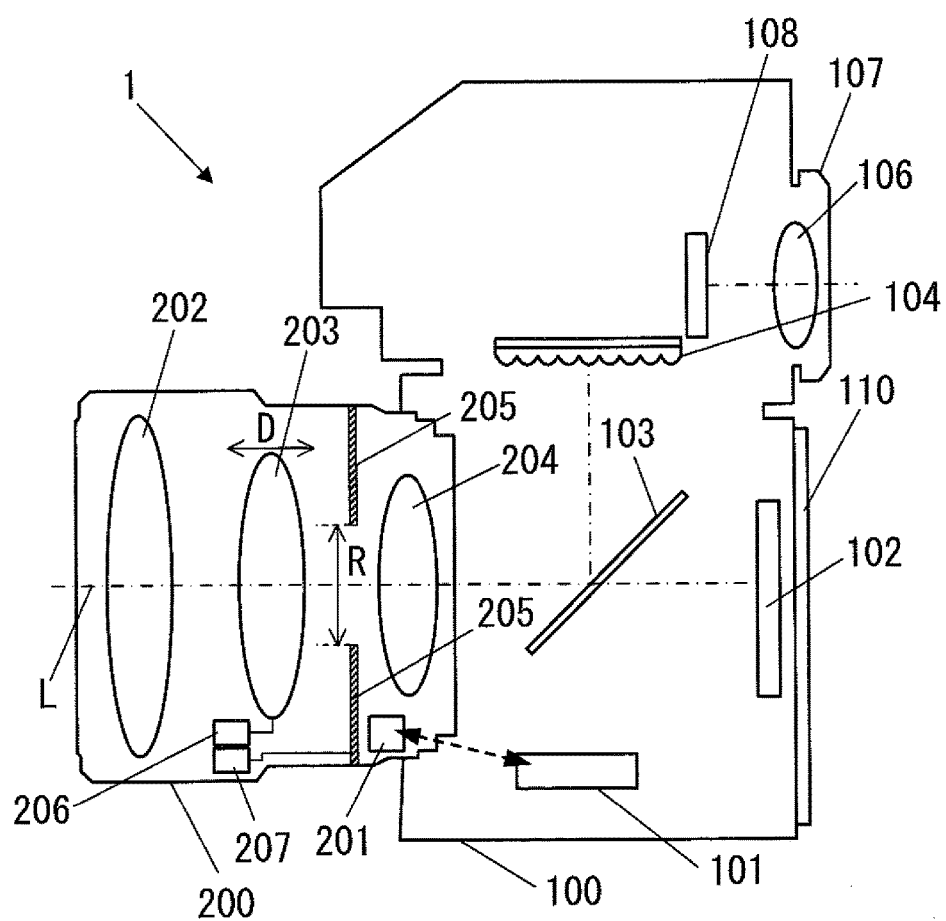

(51) Int. Cl.
*G03B 13/36* (2006.01)
*G03B 3/10* (2006.01)
*G06K 9/00* (2006.01)
*G06K 9/20* (2006.01)
*G03B 19/12* (2006.01)

(52) U.S. Cl.
CPC ......... *G06K 9/00543* (2013.01); *G06K 9/209* (2013.01); *G03B 19/12* (2013.01)

(58) Field of Classification Search
CPC .......... G03B 3/10; G03B 13/36; G03B 19/12; G06K 9/00543; G06K 9/209
USPC ........................................................ 348/349
See application file for complete search history.

(56) References Cited

U.S. PATENT DOCUMENTS

| | | | |
|---|---|---|---|
| 6,781,632 B1 | 8/2004 | Ide | |
| 6,933,978 B1 | 8/2005 | Suda | |
| 7,102,730 B2 * | 9/2006 | Takada | G03B 27/54 250/548 |
| 7,767,946 B2 | 8/2010 | Utagawa | |
| 7,846,649 B2 * | 12/2010 | Tirosh | G03F 7/70408 355/53 |
| 8,184,968 B2 | 5/2012 | Ohnishi | |
| 8,471,952 B2 | 6/2013 | Awazu | |
| 8,902,349 B2 * | 12/2014 | Matsuo | H04N 5/23212 348/345 |
| 8,988,585 B2 * | 3/2015 | Hamano | G02B 7/38 348/345 |
| 9,277,150 B2 * | 3/2016 | Ishii | H04N 5/23212 |
| 2004/0189970 A1 * | 9/2004 | Takada | G03B 27/54 355/67 |
| 2005/0275904 A1 | 12/2005 | Kido et al. | |
| 2006/0055911 A1 * | 3/2006 | Tirosh | G03F 7/70291 355/77 |
| 2006/0120711 A1 | 6/2006 | Nakata | |
| 2008/0302947 A1 | 12/2008 | Utagawa | |
| 2009/0146046 A1 | 6/2009 | Katsuda et al. | |
| 2009/0153705 A1 * | 6/2009 | Katsuda | H04N 5/23212 348/273 |
| 2010/0013947 A1 | 1/2010 | Oikawa | |
| 2010/0188522 A1 * | 7/2010 | Ohnishi | H04N 5/2254 348/222.1 |
| 2010/0302433 A1 | 12/2010 | Egawa | |
| 2011/0058070 A1 * | 3/2011 | Awazu | H04N 5/23212 348/241 |
| 2011/0091192 A1 | 4/2011 | Iwane | |
| 2011/0164169 A1 | 7/2011 | Yamasaki | |
| 2011/0273608 A1 | 11/2011 | Tsukada | |
| 2012/0062786 A1 * | 3/2012 | Hamano | G02B 7/38 348/345 |
| 2012/0092545 A1 * | 4/2012 | Sugawara | G02B 7/285 348/345 |
| 2012/0099006 A1 * | 4/2012 | Matsuo | G02B 7/36 348/241 |
| 2012/0133787 A1 * | 5/2012 | Yamaguchi | H04N 5/2258 348/208.6 |
| 2012/0147227 A1 * | 6/2012 | Yoshimura | G02B 7/346 348/246 |
| 2012/0176520 A1 | 7/2012 | Hara | |
| 2012/0176532 A1 | 7/2012 | Hara | |
| 2012/0262604 A1 * | 10/2012 | Ishii | H04N 5/23212 348/231.99 |
| 2013/0021519 A1 | 1/2013 | Hamada | |
| 2013/0258170 A1 * | 10/2013 | Tamaki | G02B 7/32 348/349 |
| 2014/0340564 A1 | 11/2014 | Isobe | |

FOREIGN PATENT DOCUMENTS

| | | |
|---|---|---|
| JP | 2006-189892 A | 7/2006 |
| JP | 2006-301031 A | 11/2006 |
| JP | 2008-304808 A | 12/2008 |
| JP | 2009-198771 A | 9/2009 |
| JP | 2009-217252 A | 9/2009 |
| JP | 2009-271523 A | 11/2009 |
| JP | 2010-008873 A | 1/2010 |
| JP | 2011-007867 A | 1/2011 |
| JP | 2011-150179 A | 8/2011 |
| WO | 2010/121637 A1 | 10/2010 |

OTHER PUBLICATIONS

Jul. 3, 2018 Office Action issued in Japanese Patent Application No. 2017-138052.
Feb. 5, 2019 Office Action issued in Japanese Patent Application No. 2017-138052.
Jul. 30, 2013 International Search Report issued in International Patent Application No. PCT/JP2013/062220.
Feb. 1, 2016 Office Action Issued in U.S. Appl. No. 14/395,083.
Mar. 21, 2016 Office Action issued in Chinese Application No. 201380033507.0.
Sep. 13, 2016 Office Action Issued in U.S. Appl. No. 14/395,083.
Sep. 20, 2016 Office Action issued in Japanese Patent Application No. 2014-512685.
Feb. 27, 2017 Office Action issued in U.S. Appl. No. 14/395,083.
Apr. 18, 2017 Office Action issued in Japanese Application No. 2014-512685.
Sep. 11, 2017 Office Action issued in U.S. Appl. No. 14/395,083.
Sep. 12, 2017 Office Action issued in Chinese Patent Application No. 201380033507.0.

* cited by examiner (a)

(b)

(a)

(b)  (c)

(a)

(b)

(c)

(a)

(b)

(c)

FOCUS DETECTION DEVICE, FOCUS ADJUSTMENT DEVICE AND CAMERA

This application is a continuation application of U.S. patent application Ser. No. 14/395,083 filed Jan. 26, 2015 which is in turn a U.S. National Stage of International Application No. PCT/JP 2013/062220 filed Apr. 25, 2013, which claims the benefit of Japanese Patent Application No. 2012-158796 filed Jul. 17, 2012 and Japanese Patent Application No. 2012-100150 filed Apr. 25, 2012. The disclosure of the prior applications is hereby incorporated by reference herein in their entirety.

TECHNICAL FIELD

The present invention relates to a focus detection device, a focus adjustment device and a camera.

BACKGROUND ART

Focus detection devices that detect focus through a method known as the phase difference detection method in the related art detect an extent of image subject image shift based upon the outputs from a plurality of light receiving elements arrayed in correspondence to each of micro-lenses disposed in a two-dimensional pattern. Patent literature 1, for instance, describes a focus detection device that detects contrast along a plurality of directions and selects an optimal focus detection direction among the plurality of directions based upon the detected contrast.

CITATION LIST

Patent Literature

Patent literature 1: Japanese Laid Open Patent Publication No. 2009-198771

SUMMARY OF INVENTION

Technical Problem

There is an issue with the related art in that accurate and efficient focus adjustment cannot always be assured, i.e., focus adjustment for certain types of subjects may be less than accurate or efficient.

Solution to Problem

According to the 1st aspect of the present invention, a focus detection device comprises: a plurality of micro-lenses at which light fluxes having been transmitted through an image forming optical system enter, disposed in a two-dimensional array pattern; a plurality of light receiving elements disposed in correspondence to each of the plurality of micro-lenses; a focus detection unit that executes a detection of a defocus quantity of the image forming optical system by detecting, based upon outputs from the plurality of light receiving elements, a phase difference manifested by a plurality of light fluxes having passed through different areas of the image forming optical system; and a recognition unit that recognizes, based upon the outputs from the plurality of light receiving elements, characteristics of a subject image formed onto the plurality of light receiving elements via the plurality of micro-lenses, wherein: the focus detection unit detects the defocus quantity through a method optimal for the characteristics of the subject image recognized by the recognition unit.

According to the 2nd aspect of the present invention, in the focus detection device according to the 1st aspect, the characteristics of the subject image may manifest as a pattern in the subject image.

According to the 3rd aspect of the present invention, a focus adjustment device comprises: a plurality of micro-lenses disposed in a two-dimensional array pattern so as to allow light fluxes, having been transmitted through an image forming optical system, to enter thereat; a plurality of light receiving elements disposed in correspondence to each of the plurality of micro-lenses on a rear side of the micro-lens; a recognition unit that recognizes, based upon light reception outputs from the plurality of light receiving elements, a pattern in a subject image formed onto the plurality of light receiving elements via the plurality of micro-lenses; and a focus adjustment unit that executes focus adjustment for the image forming optical system by detecting, based upon the light reception outputs, a phase difference manifested by a pair of light fluxes having passed through different areas of the image forming optical system, wherein: the focus adjustment unit executes focus adjustment optimal for the pattern in the subject image recognized by the recognition unit.

According to the 4th aspect of the present invention, in the focus adjustment device according to the 3rd aspect, the recognition unit may be capable of recognizing at least a cyclical pattern, an edge pattern and a gradation pattern.

According to the 5th aspect of the present invention, it is preferred that in the focus adjustment device according to the 3rd or 4th aspect, in correspondence to the pattern in the subject image recognized by the recognition unit, the focus adjustment unit switches at least one of; positions of a plurality of light receiving elements selected for purposes of generating a pair of signal strings for phase difference detection, a width represented by the pair of signal strings, a quantity of light receiving elements to be used when generating the pair of signal strings and whether or not to remove a low-frequency signal from the pair of signal strings.

According to the 6th aspect of the present invention, in the focus adjustment device according to any one of the 3rd through 5th aspects, the focus adjustment unit may make a decision, based upon the pattern in the subject image recognized by the recognition unit, as to whether or not the detected phase difference indicates a false focus match.

According to the 7th aspect of the present invention, in the focus adjustment device according to the 6th aspect upon deciding that the detected phase difference indicates the false focus match, the focus adjustment unit may again detect the phase difference based upon the pair of light fluxes forming a smaller opening angle.

According to the 8th aspect of the present invention, in the focus adjustment device according to the 6th aspect upon deciding that the detected phase difference indicates the false focus match, the focus adjustment unit may reverse a direction along which a focusing lens included in the image forming optical system is driven.

According to the 9th aspect of the present invention, in the focus adjustment device according to any one of the 6th through the 8th aspects if the recognition unit recognizes a nonuniform pattern formed, via each of the plurality of micro-lenses, on the plurality of light receiving elements disposed on the rear side of the micro-lens, and the detected phase difference is equal to or less than a predetermined threshold value, the focus adjustment unit may decide that the detected phase difference indicates the false focus match.

According to the 10th aspect of the present invention, a focus adjustment device comprises: a plurality of micro-lenses disposed in a two-dimensional array pattern so as to allow light fluxes, having been transmitted through an image forming optical system that includes a focusing lens, to enter thereat; a plurality of light receiving elements disposed in correspondence to each of the plurality of micro-lenses at positions at which the light fluxes, having been transmitted through the micro-lens, enter; a recognition unit that recognizes, based upon light reception outputs from the plurality of light receiving elements, a cyclical pattern in a subject image formed via the plurality of micro-lenses on the plurality of light receiving elements; a phase difference detection unit that detects, based upon the light reception outputs, a phase difference manifested by a pair of light fluxes having passed through different areas of the image forming optical system; and the focus adjustment unit that executes focus adjustment for the image forming optical system by driving the focusing lens based upon the phase difference detected by the phase difference detection unit, wherein: if the cyclical pattern is recognized by the recognition unit, the focus adjustment unit drives the focusing lens along a direction in which cycles in the cyclical pattern are lengthened.

According to the 11th aspect of the present invention, in the focus adjustment device according to the 10th aspect the recognition unit may execute a Fourier transform on the light reception outputs and recognizes the cyclical pattern in a spatial frequency range.

According to the 12th aspect of the present invention, in the focus adjustment device according to the 10th or 11th aspect the recognition unit may recognize the cyclical pattern by detecting edges from light reception outputs from the plurality of light receiving elements corresponding to at least one micro-lens among the plurality of micro-lenses.

According to the 13th aspect of the present invention, in the focus detection device according to the 10th or 11th aspect the recognition unit may recognize the cyclical pattern by calculating sums of light reception outputs from the plurality of light receiving elements corresponding to at least two micro-lenses among the plurality of micro-lenses and comparing the two sums.

According to the 14th aspect of the present invention, a camera equipped with the focus adjustment device according to any one of the 3rd through 13th aspects.

Advantageous Effect of the Invention

The present invention enables accurate and efficient focus adjustment in correspondence to a subject pattern.

BRIEF DESCRIPTION OF THE DRAWINGS (FIG. 1) A sectional view of a camera system, used in conjunction with interchangeable lenses, which may adopt the present invention (FIG. 2) Perspective of the focus detection unit 104

(FIG. 3) A schematic illustration of the ranges over which light fluxes from the micro-lenses 13 enter, superimposed over the light-receiving surface of the light receiving element array 12

Figure 4:
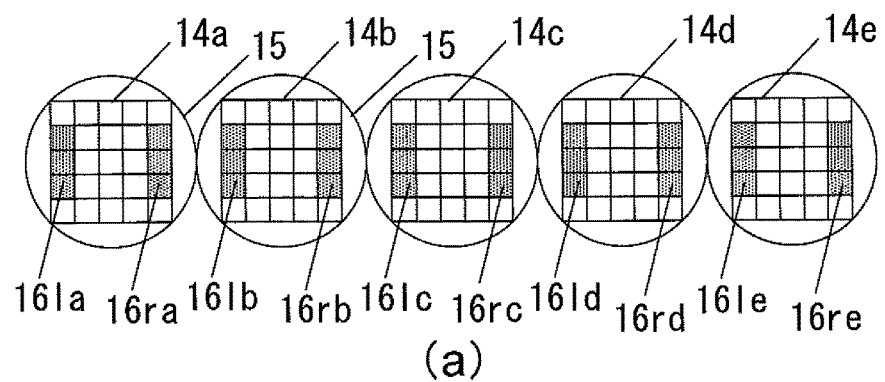
Figure 4:
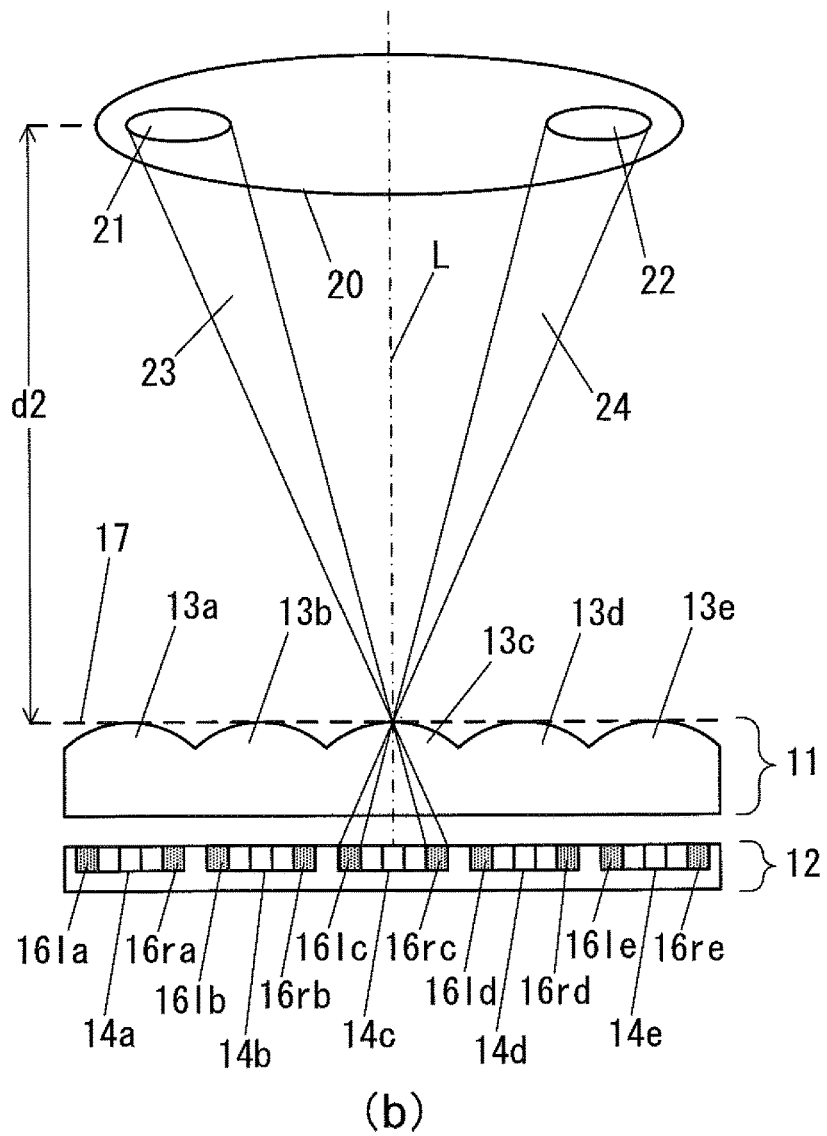

(FIG. 4) An illustration of the focus detection method adopted by the body control device 101

(FIG. 5) A schematic illustration showing a condition in which focus match is achieved for the focus adjustment target subject (FIG. 6) A schematic illustration showing a condition in which focus match is not achieved for the focus adjustment target subject (FIG. 7) Examples of patterns that may be recognized by the body control device 101

(FIG. 8) A flowchart of focus adjustment control executed by the body control device 101

Figure 8:
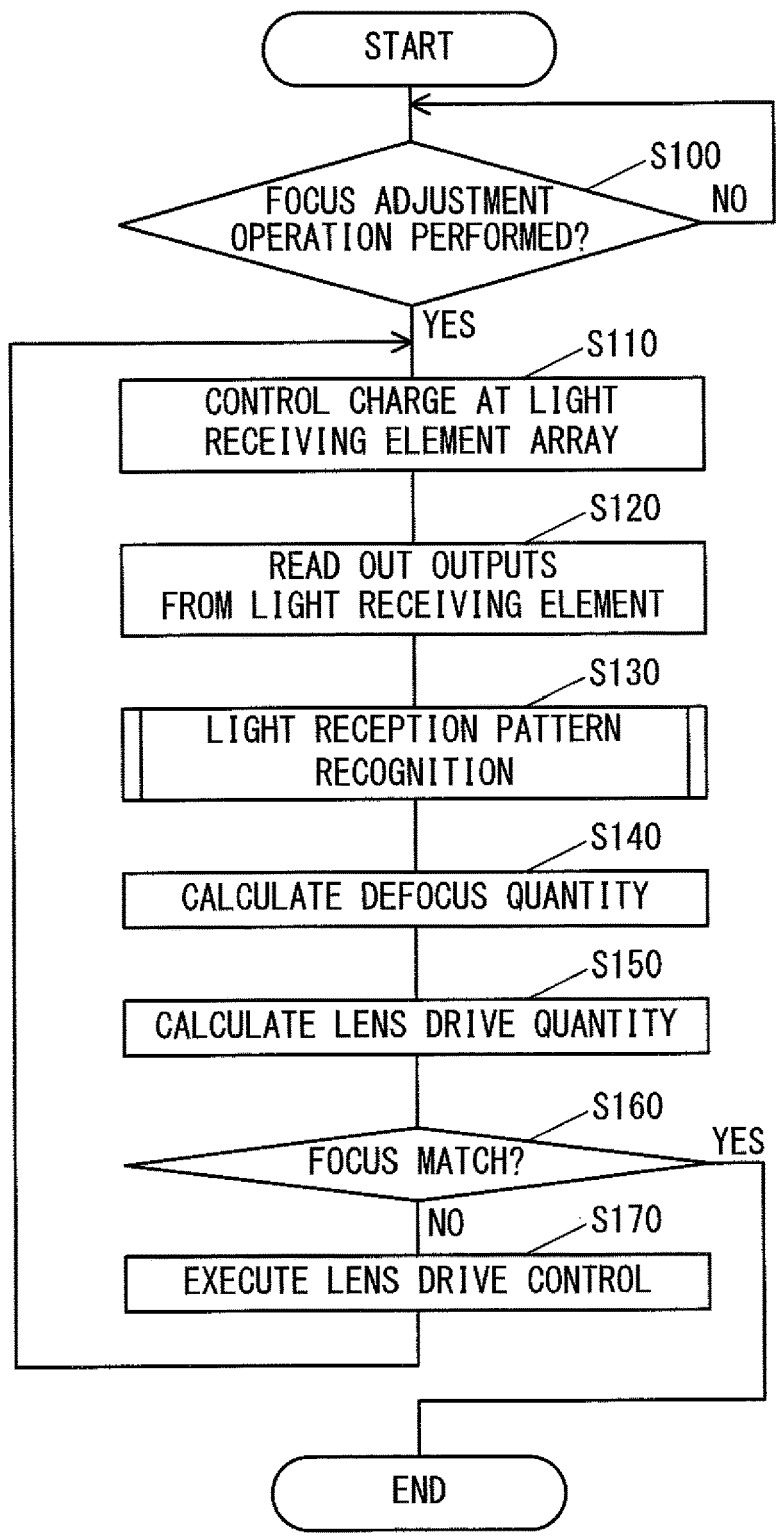

(FIG. 9) A flowchart of the light reception pattern recognition processing called up in step S130 in FIG. 8

(FIG. 10) An example of a cyclical pattern that may be recognized by the body control device 101

(FIG. 11) A flowchart of focus adjustment control executed by the body control device 101

Figure 11:
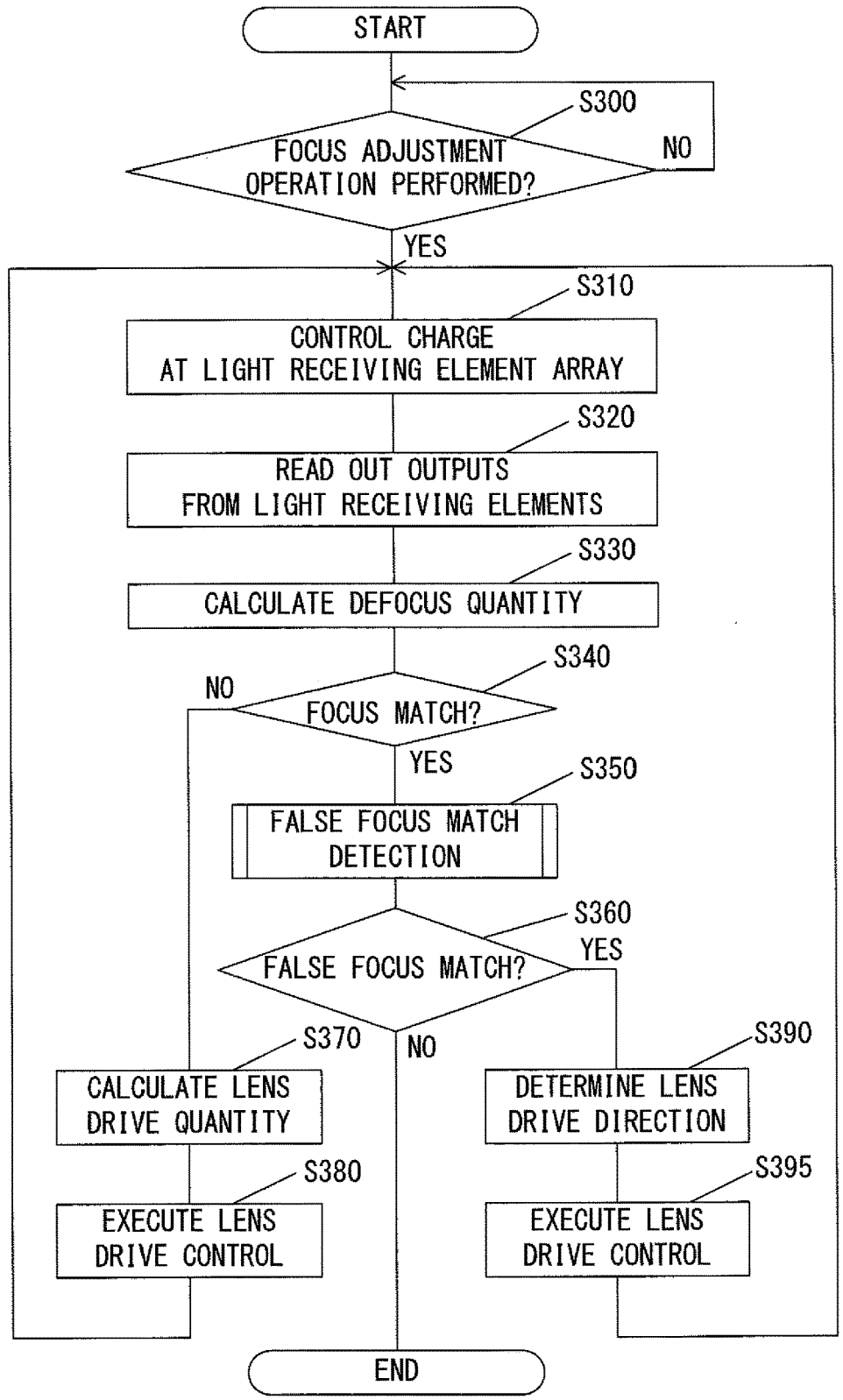

(FIG. 12) A flowchart of the false focus match detection processing called up in step S350 in FIG. 11

DESCRIPTION OF EMBODIMENTS

First Embodiment

FIG. 1 is a sectional view of a camera system, used in conjunction with interchangeable lenses, which adopts the present invention. A camera 1 comprises a camera body 100 and an interchangeable lens 200 that can be mounted at/dismounted from the camera body 100.

At the interchangeable lens 200, a photographic optical system comprising a plurality of lenses 202, 203 and 204, and an aperture 205 having an opening portion are disposed. A light flux departing a subject passes through the photographic optical system and the opening portion of the aperture 205 before entering the camera body 100. It is to be noted that while FIG. 1 shows the photographic optical system made up with three lenses, the photographic optical system may include any number of lenses. In addition, while the aperture 205 in FIG. 1 is disposed between the lens 203 and the lens 204, the aperture 205 may instead be disposed further frontward or rearward relative to the photographic optical system or between other lenses, as known in the related art.

The lens 203 included in the photographic optical system is a focusing lens used to adjust the focusing position for the photographic optical system. The focusing lens 203 is connected to a lens drive device 206 via a drive mechanism (not shown) configured with gears and the like. The lens drive device 206, which includes an actuator (not shown) such as a stepping motor, drives the focusing lens 203 in direction D running along an optical axis L of the photographic optical system.

An aperture drive device 207 is connected to the aperture 205. The aperture drive device 207, which includes an actuator (not shown) such as a stepping motor, alters the opening radius R at the aperture 205 by driving a drive mechanism (not shown).

An image sensor 102 such as a CCD sensor or a CMOS sensor, capable of capturing a subject image formed by the photographic optical system, is disposed at the camera body 100. The image sensor 102 is disposed so that its imaging plane matches a pre-determined focal plane of the photographic optical system. A half mirror 103 is disposed between the photographic optical system and the imaging plane of the image sensor 102 within the camera body 100. The half mirror 103, which may be configured with, for instance, a pellicle mirror, allows part of the subject light having departed the photographic optical system to be transmitted toward the image sensor 102 and reflects the remaining subject light toward the top of the camera body 100. The reflected light enters a focus detection unit 104 disposed on the upper side in the camera body 100. Structural features of the focus detection unit 104 will be described in detail later.

A body control device 101 comprising a microprocessor and its peripheral circuits is disposed at the camera body 100. The body control device 101 controls various units at the camera body 100 by executing a specific control program read out from a storage medium (not shown) where the program is stored in advance. The interchangeable lens 200 includes a lens control device 201 likewise comprising a microprocessor and its peripheral circuits. The lens control device 201 controls various units in the interchangeable lens 200 by executing a specific control program read out from a storage medium (not shown) where the control program is stored in advance. It is to be noted that the body control device 101 and the lens control device 201 may each be configured with an electronic circuit capable of executing operation equivalent to the control program.

The body control device 101 and the lens control device 201 are configured so as to be able to communicate with each other via an electric contact point (not shown) disposed in the vicinity of the lens mount. Through data communication enabled via the electric contact point, the body control device 101 transmits, for instance, a drive command for the focusing lens 203 and a drive command for the aperture 205 to the lens control device 201. It is to be noted that the data communication may be carried out through a method (e.g., wireless communication or optical communication) other than the electrical signal exchange via the electric contact point.

In response to a specific focus adjustment operation (e.g., a halfway press operation of a shutter release switch (not shown)) the body control device 101 detects a defocus quantity representing the extent of defocus based upon an output from the focus detection unit 104 and transmits a drive command to the lens control device 201 so as to drive the focusing lens 203 by an extent corresponding to the defocus quantity. In response to this drive command, the lens control device 201 engages the lens drive device 206 to drive the focusing lens 203. Consequently, a focus match is achieved for a specific subject.

A monitor 110 constituted with, for instance, a liquid crystal display element, is disposed on the rear surface of the camera 1. The body control device 101 uses this monitor 110 when, for instance, reproducing still image data or movie image data obtained through a shooting operation, displaying a settings menu in which photographing parameters (aperture number, shutter speed and the like) can be selected for the camera 1, displaying a live view image and the like.

An electronic viewfinder unit 108, which includes a display element such as a liquid crystal display element, is disposed at an upper portion of the camera body 1. The photographer is able to view a subject image or the like displayed at the display element of the electronic viewfinder unit 108 via an eyepiece lens 106 through a finder portion 107. When the camera 1 is set in the photographing mode, the body control device 101 engages the image sensor 102 so as to capture a subject image over predetermined intervals (e.g., every 1/60 sec), generates a live view image based upon the image capturing signals and displays the live view image thus created at the monitor 110 or the electronic viewfinder unit 108.

In response to a specific still image shooting operation (e.g., a full press operation of the shutter release switch (not shown)) performed in the photographing mode, the body control device 101 executes photographing control. At this time, the body control device 101 engages the image sensor 102 to capture the subject image by controlling the shutter and the like (not shown). It then executes various types of image processing on image capturing signals output from the image sensor 102 and stores still image data generated through the image processing into a storage medium (not shown) such as a memory card.

Description of the Focus Detection Unit 104

Figure 2:
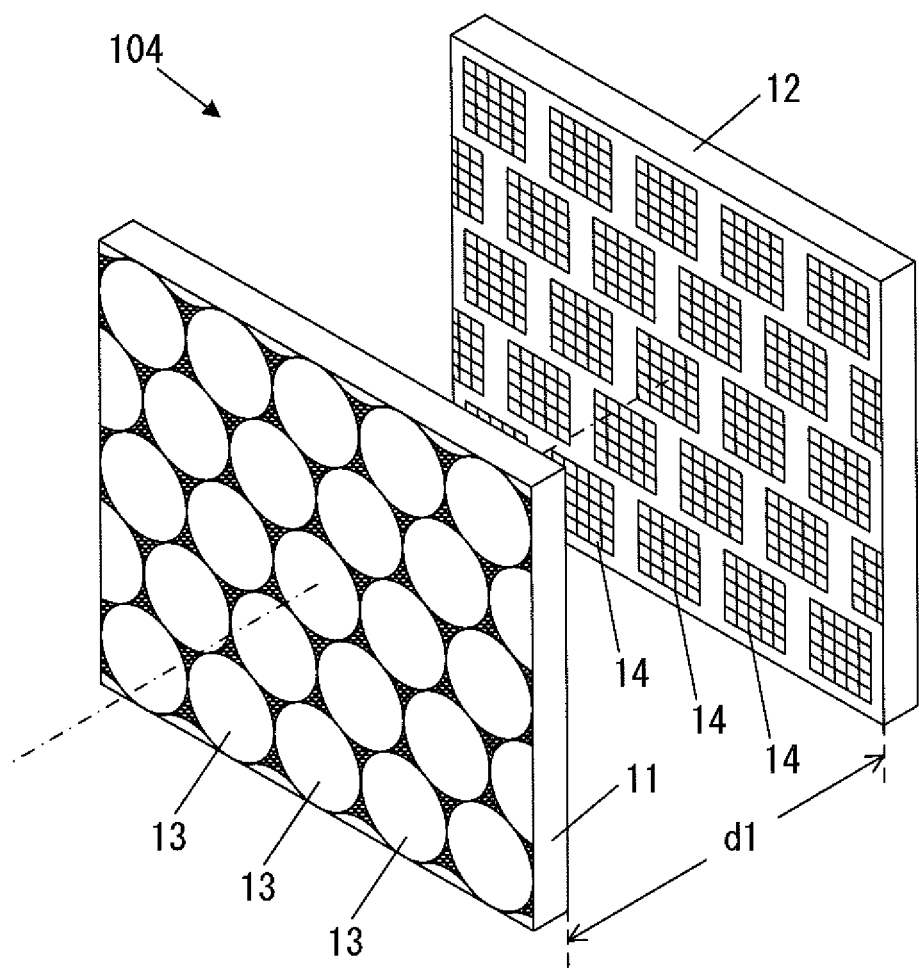

FIG. 2 shows the focus detection unit 104 in a perspective. The focus detection unit 104 comprises a micro-lens array 11 and a light receiving element array 12 disposed further rearward relative to the micro-lens array 11.

Numerous micro-lenses 13 are disposed in a two-dimensional pattern at the micro-lens array 11. Subject light having been reflected at the half mirror 103 passes through a micro-lens 13 among the micro-lenses 13 and enters the light-receiving surface of the light receiving element array 12. Numerous light receiving element groups 14 where light fluxes having passed through individual micro-lenses 13 enter are arrayed in a two-dimensional pattern at the light-receiving surface (the surface facing toward the micro-lens array 11) of the light receiving element array 12. Each light receiving element group is made up with 25 light receiving elements disposed in a 5 (row)×5 (column) array. A light flux having passed through a given micro-lens 13 enters one of the light receiving element groups 14, and the plurality of light receiving elements constituting the particular light receiving element group 14 receives the light flux.

The area of the surface of the micro-lens array 11 (the surface where the subject light enters) over which no micro-lens 13 is present is shielded with a light-blocking mask. For this reason, only a light flux that has passed through a micro-lens 13 is allowed to enter the light receiving element array 12.

The light receiving element array 12 is disposed at a position set apart from the micro-lens array 11 by a distance equal to the focal length of the micro-lenses 13. In order to assure clarity in the illustration, the distance "d" between the micro-lens array 11 and the light receiving element array 12 is exaggerated in FIG. 2.

It is to be noted that FIG. 2 only shows part of the micro-lens array 11 and part of the light receiving element array 12. Namely, the actual micro-lens array and light receiving element array include greater numbers of micro-lenses 13 and light receiving element groups 14. In addition, the quantity of light receiving elements included in each light receiving element group 14 may be more than or fewer than 25 and the light receiving elements may be arrayed in a pattern other than that shown in FIG. 2.

Figure 3:
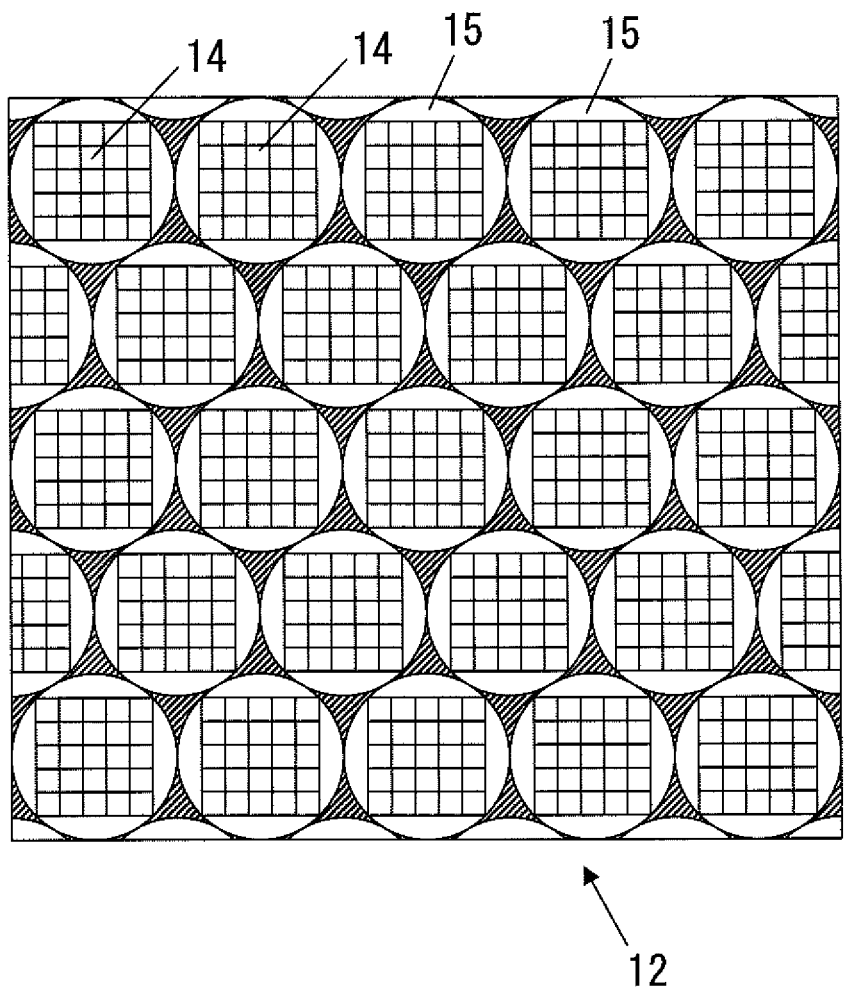

FIG. 3 is a schematic illustration of the ranges of entry of light fluxes, having departed micro-lenses 13, superimposed over the light-receiving surface of the light receiving element array 12. When the f-number of the photographic optical system matches the f-number of the micro-lenses 13, a light flux having departed a given micro-lens 13 enters within the range of a circle 15 enclosing a light receiving element group 14. When the aperture 205 is constricted and the f-number at the photographic optical system takes on a value greater than the f-number of the micro-lenses 13 (when the photographic optical system is darkened relative to the micro-lenses 13), the size of the circles 15 becomes smaller than that shown in FIG. 3.

It is to be noted that when the f-number at the photographic optical system is set to a value smaller than the f-number of the micro-lenses 13 (i.e., when the photographic optical system is rendered lighter relative to the micro-lenses 13), the size of the circles 15 becomes greater than that shown in FIG. 3 and individual circles 15 overlap one another. Namely, crosstalk between light fluxes having passed through the micro-lenses 13 occurs. If light fluxes having passed through a plurality of micro-lenses 13 enter a single light receiving element in this state, accurate focus detection is no longer possible. During focus detection, the body control device 101 in the embodiment adjusts the aperture 205 so as to match the f-number at the photographic optical system with the f-number of the micro-lenses 13. In other words, the crosstalk phenomenon described above does not occur during focus detection since it is ensured that each subject light flux enters within the range of a circle 15 shown in FIG. 3.

Description of the Focus Detection Method

The body control device 101 detects the focal point through the method known as the phase difference detection method whereby an image shift quantity, i.e., the extent of image shift pertaining to the subject image, is detected based upon an output from the focus detection unit 104. The following is a description of the focus detection method adopted by the body control device 101.

FIG. 4(a) shows a single row of light receiving element groups 14 engaged in focus detection among the numerous light receiving element groups 14 shown in FIG. 3. While FIG. 4(a) shows only 5 light receiving element groups 14, it is desirable to select a greater number of light receiving element groups 14 for focus detection. In the following description, different reference numerals 14a through 14e are used to refer to the individual light receiving element groups 14.

FIG. 4(b) is a schematic illustration of the relationships between the light receiving element groups 14a through 14e and the focus detection pupils. The micro-lenses 13a through 13e are disposed so that their apexes are substantially in alignment with a predetermined focal plane 17 of the photographic optical system. The micro-lens 13c projects the shapes of a pair of light receiving elements 16lc and 16rc disposed to the rear thereof onto an exit pupil 20 set apart from the micro-lens 13c by a projecting distance d2, and the shapes of the light receiving elements thus projected form focus detection pupils 21 and 22. The projecting distance d2 is determined in correspondence to the curvature and the refractive index of the micro-lens 13c, the distance between the micro-lens 13c and the light receiving element array 12, and the like. The pair of focus detection pupils 21 and 22 and the pair of light receiving elements 16lc and 16rc achieve a relationship conjugate with each other via the micro-lens 13c.

It is to be noted that while an explanation has been given above in reference to the pair of light receiving elements 16lc and 16rc belonging to the light receiving element group 14c set on the optical axis L and the pair of focus detection pupils 21 and 22 so as to simplify the description, a pair of light receiving elements in a light receiving element group taking up a position away from the optical axis L, too, receive a light flux arriving at the corresponding micro-lens from a pair of focus detection pupils.

The light receiving element 16lc outputs a light reception signal corresponding to the intensity of an image formed on the micro-lens 13c with a focus detection light flux 24 having passed through the focus detection pupil 22 and traveled toward the micro-lens 13c. Likewise, the light receiving element 16rc outputs a light reception signal corresponding to the intensity of an image formed on the micro-lens 13c with a focus detection light flux 23 having passed through the focus detection pupil 21 and traveled toward the micro-lens 13c.

Accordingly, information pertaining to intensity distributions of a pair of images formed on the light receiving element array 12 with focus detection light fluxes each passing through the focus detection pupil 21 and 22 can be obtained by acquiring the light reception outputs of each pair of light receiving elements corresponding to the focus detection pupil 21 and the focus detection pupil 22 from the plurality of light receiving element groups 14a through 14e disposed along a straight line, as shown in FIG. 4(a). By executing an image shift detection operation of the known art in conjunction with the information thus acquired, an image shift quantity representing the extent of image shift manifested by the pair of images is detected through a detection method commonly referred to as the split pupil phase difference detection method. Then, the image shift quantity is converted in correspondence to the distance between the gravitational centers of the pair of focus detection pupils 21 and 22 so as to calculate a defocus quantity representing the deviation of the current imaging plane relative to the predetermined focal plane.

The image shift detection operation and the conversion operation will be described in more specific terms. The body control device 101 first designates the value obtained by adding together the light reception outputs of the three middle light receiving elements 16la at the left end column in the light receiving element group 14a as a(1). Likewise, it calculates the sums a(2) through a(5) in correspondence to the light receiving element groups 14b through 14e, each by adding together the light reception outputs of the three middle light receiving elements 16lb, 16lc, 16ld or 16le at the left end column in the corresponding light receiving element group. Next, for the light receiving element groups 14a through 14e, it calculates sums by adding together the light reception outputs of the three middle light receiving elements 16ra through 16re at the right end columns and designates the sums as b(1) through b(5). A pair of signal strings a(i) and b(i) generated as described above constitutes information pertaining to the intensity distribution of the pair of images mentioned earlier. The body control device 101 executes a correlation operation for the pair of signal strings by individually offsetting the signal strings in small steps and calculates a correlation quantity in correspondence to each offset quantity. Then, based upon the correlation quantity calculation results, it determines the offset quantity in correspondence to which a minimum correlation quantity is calculated (the offset quantity at which a maximum degree of correlation quantity manifests). The body control device 101 multiplies the offset quantity by a predetermined conversion coefficient in order to calculate a defocus quantity representing the extent of defocusing manifested by the subject image relative to the predetermined focal plane.

It is to be noted that the row of light receiving element groups 14 to be engaged in focus detection, among the numerous light receiving element groups 14, may be selected through any method. For instance, the user may be asked to specify the position of the focusing target subject and light receiving element groups 14 present at the particular position may be selected. As an alternative, light receiving element groups 14 present at a predetermined position, such as the center of the photographic field, may be selected.

Description of a Cyclical Pattern Formed on the Light-Receiving Surface

For each session of focus detection and focus adjustment, the body control device 101 recognizes, through a pattern-matching technology of the known art, the pattern of an image formed via the micro-lenses 13 onto the light-receiving surface of the light receiving element array 12. Based upon the recognized pattern, it alters the specific details of the focus detection and the focus adjustment. The following is a description of the pattern of an image formed on the light-receiving surface of the light receiving element array 12.

Figure 5:
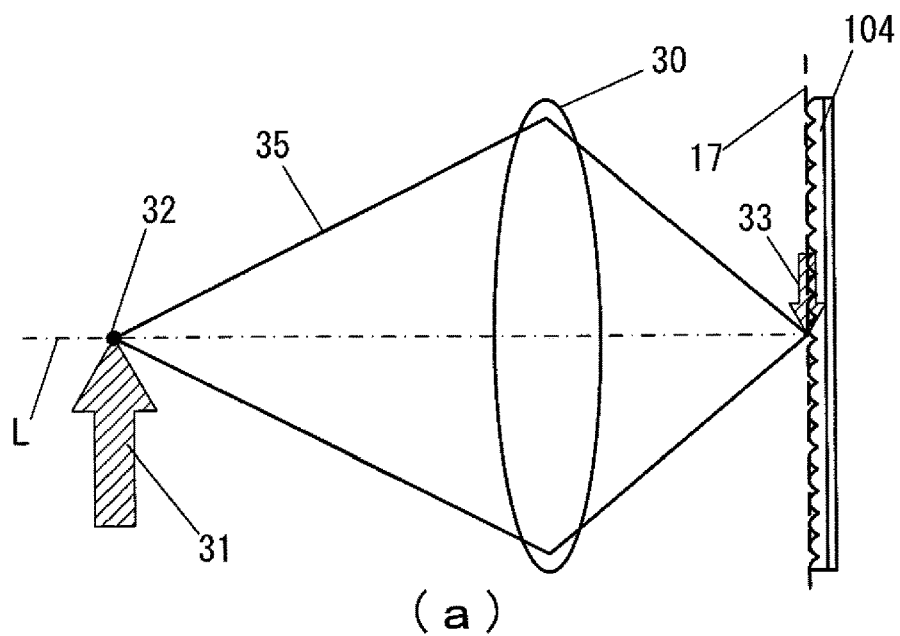
Figure 5:
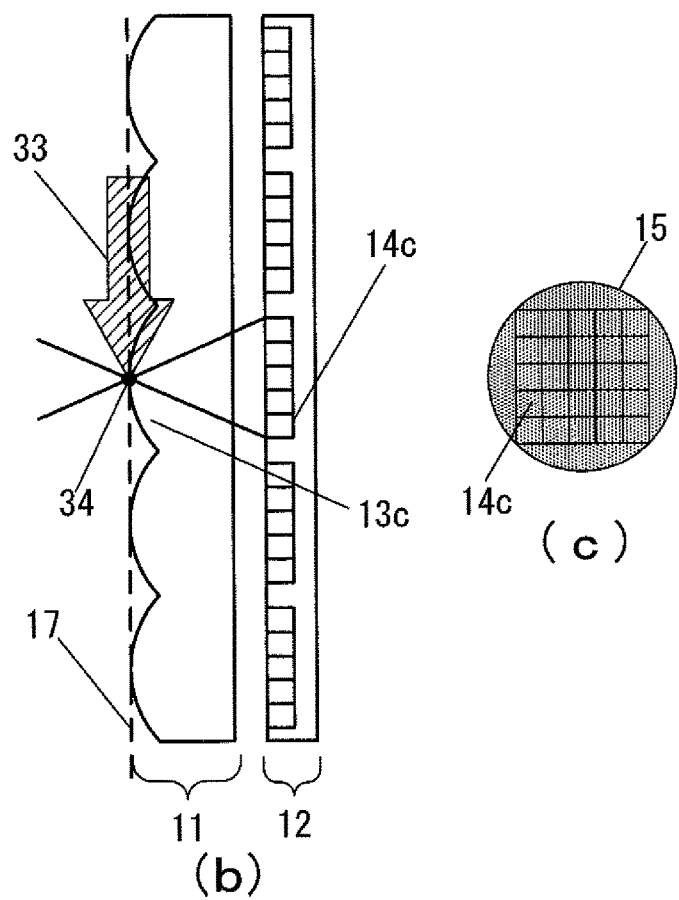

FIG. 5 is a schematic illustration of a subject 31, a photographing optical system 30, a subject image 33, the predetermined focal plane 17, the micro-lens array 11 and the light receiving element array 12 in a state in which the focus adjustment target subject is in focus. It is to be noted that the photographic optical system is represented by a single lens in the schematic illustration in FIG. 5.

When a focus match is achieved for the focus adjustment target subject 31, the image (subject image) 33 of the subject 31, formed by the photographic optical system 30, is substantially in alignment with the predetermined focal plane 17, and a light flux 35, having departed a point 32 on the subject 31 and passed through the photographic optical system 30, has converged so that its section is smaller than the permissible circle of confusion on the predetermined focal plane 17, as illustrated in FIG. 5(a).

FIG. 5(b) shows an area near the focus detection unit 104 in an enlarged view. In this condition, a light flux having departed a point 34 on the subject image 33 enters with substantial uniformity on the rear side of the micro-lens 13c, as illustrated in FIG. 5(c). The light flux, having departed the point 34, does not enter any of the other micro-lenses 13, and no light flux from any other point on the subject image 33 enters on the rear side of the micro-lens 13c.

Figure 6:
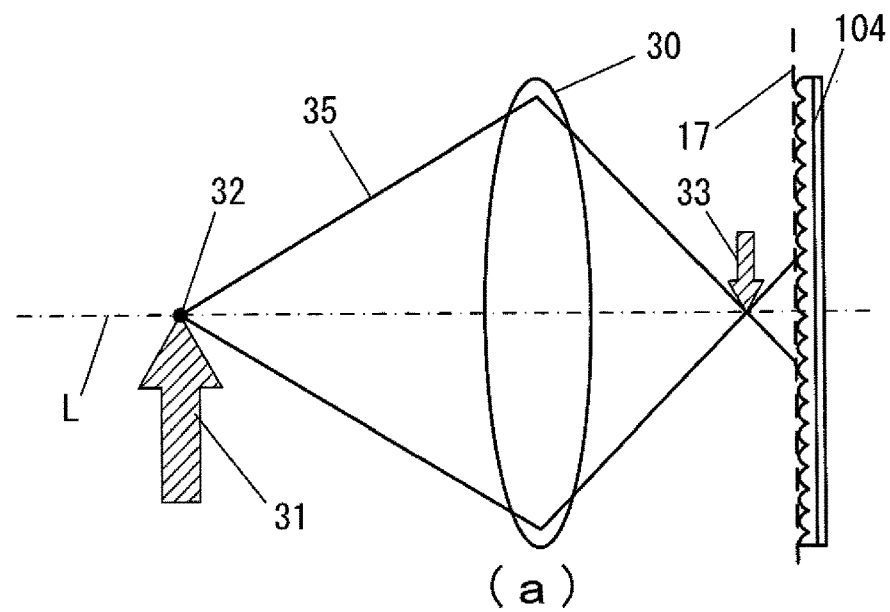
Figure 6:
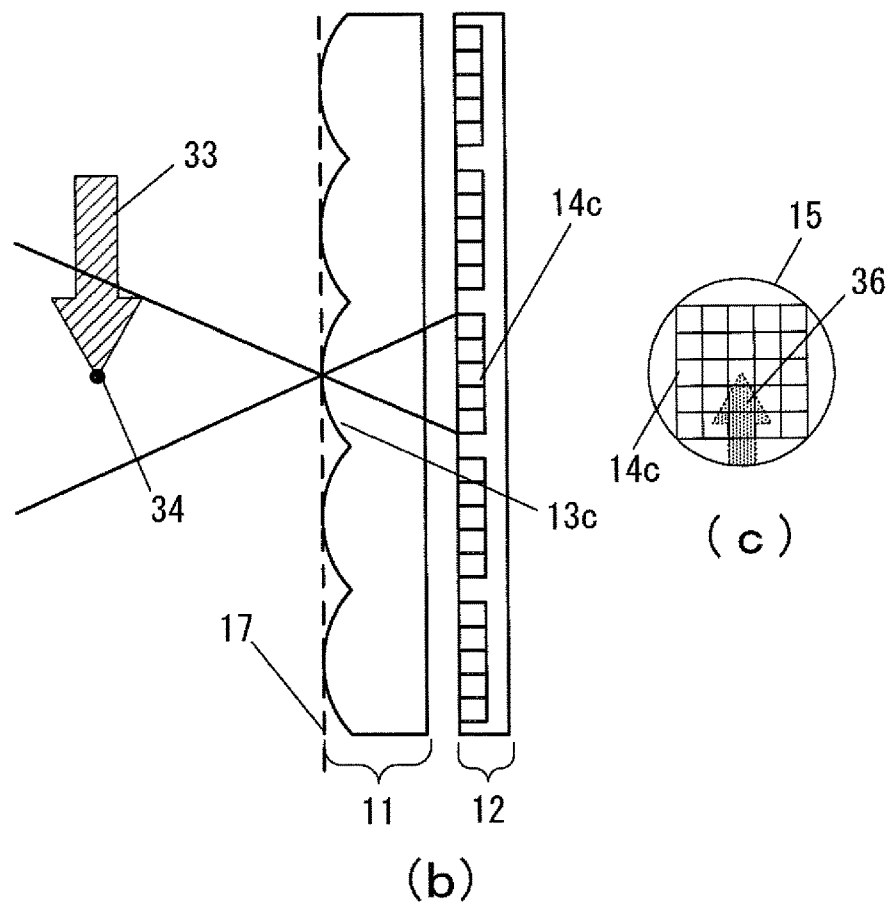

FIG. 6 is a schematic illustration of the subject 31, the photographic optical system 30, the subject image 33, the predetermined focal plane 17, the micro-lens array 11 and the light receiving element array 12 in a state in which the focus adjustment target subject is not in focus.

When the image 33 of the subject 31, formed via the photographic optical system 30, is set apart from the predetermined focal plane 17 by a distance equal to or greater than twice the focal length of the micro-lenses 30, the light flux 35, having departed the point 32 on the subject 31 and passed through the photographic optical system 30 reaches the predetermined focal plane 17 as light widening over a certain range, as illustrated in FIG. 6(a). This means that the light flux 35, having departed the point 32, enters a plurality of micro-lenses 13. In addition, as illustrated in the enlarged view in FIG. 6(b), light fluxes, having departed a plurality of points on the subject image 33, enter a single micro-lens 13c. As a result, an image 36 is projected onto the rear side of the micro-lens 13c in correspondence to the shape of the subject image 33 and the positional relationship between the subject image 33 and the micro-lenses 13.

Next, patterns that may be recognized by the body control device 101 to be used for focus detection and focus adjustment in the embodiment will be described in reference to the examples presented in FIG. 7.

Figure 7:
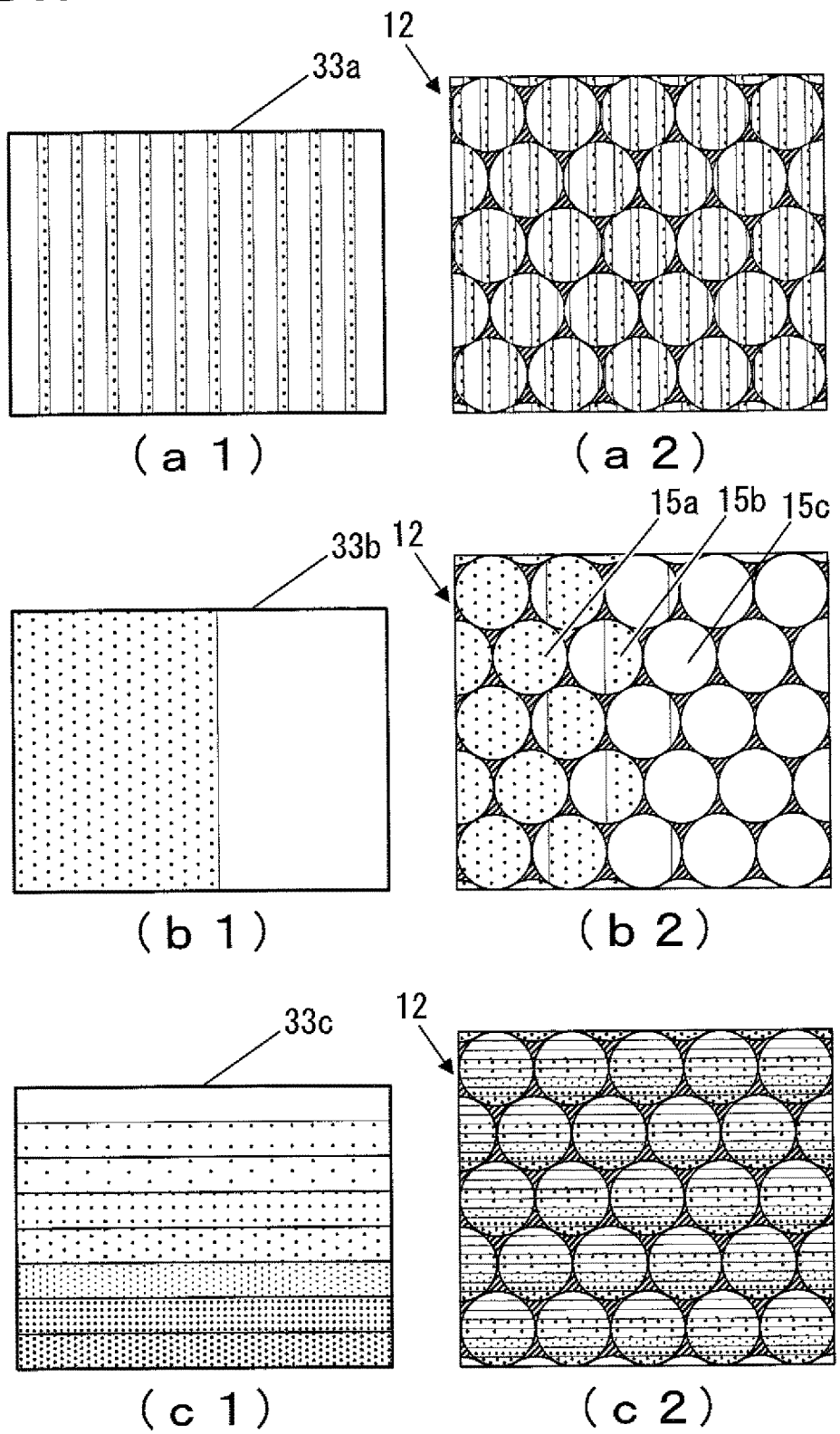

FIG. 7(a1) shows a subject image 33a with vertical stripes. If this subject image 33a is formed at a position somewhat set apart from the predetermined focal plane 17, the pattern shown in FIG. 7(a2) is formed on the light-receiving surface of the light receiving element array 12. In this situation, the light reception outputs obtained from light receiving elements set consecutively along the lateral direction in a single row in a given light receiving element group 14 will include a plurality of peaks each in correspondence to a vertical stripe.

The body control device 101 determines that the subject 31 is a cyclic subject taking on a cyclical pattern in a case such as this in which the light reception outputs of the light receiving elements set side-by-side in a single row along a specific direction within a given light receiving element group 14 include a plurality of peaks. In this situation, if the absolute value of the defocus quantity is less than a predetermined threshold value (i.e., if the current condition is judged to be a focus match state) in the subsequent focus detection operation, the particular defocus quantity is determined to be incorrect (i.e., the current condition is a false focus match state). The rationale for this decision-making is that if a focus match was achieved for the subject 31, a uniform light flux would enter at a single light receiving element group 14 as illustrated in FIG. 5(c) and that a pattern such as that shown in FIG. 7(a2) could never be formed in a true focus match state.

Upon determining that the defocus quantity is incorrect (i.e., the current condition is a false focus match state), the body control device 101 re-executes the focus detection operation by reducing the angle of detection range. Namely, instead of the light receiving elements at the two end columns on the left side and the right side shown in FIG. 4(a), light receiving elements at inner positions are used to create a pair of signal strings and the image shift detection operation and the conversion operation are executed in conjunction with the pair of signal strings thus created.

The subject image shown in FIG. 7(b1) will be explained next. FIG. 7(b1) shows a subject image 33b with a clear boundary (edge) dividing it along the left/right direction. If this subject image 33b is formed at a position somewhat set apart from the predetermined focal plane 17, the pattern shown in FIG. 7(b2) is formed on the light-receiving surface of the light receiving element array 12.

If outputs completely different from each other (e.g., circles 15a and 15c) are detected from a pair of light receiving element groups 14 present in close proximity to each other and these two different outputs are inverted in the output from a light receiving group 14 (e.g., a circle 15b) present between the pair of light receiving element groups, the body control device 101 determines that the subject 31 is an edge subject assuming an edge pattern. In the subsequent focus detection operation, it generates a pair of signal strings to be used in image shift detection operation from light receiving element groups 14 set side-by-side in a single row running perpendicular to the detected edge. In addition, the light receiving element groups 14, the outputs from which are to be sampled in order to generate the pair of signal strings, are selected from a range narrower than normal and thus, the signal strings assume a length smaller than normal. The rationale for this is that since there is obviously a well-defined edge, only an area around the edge needs to be the focus detection target.

The subject image shown in FIG. 7(c1) will be explained next. FIG. 7(c1) shows a subject image 33c with a gradation pattern manifesting a gradual change in luminance or chromaticity along the up/down direction. If this subject image 33c is formed at a position somewhat set apart from the predetermined focal plane 17, the pattern shown in FIG. 7(c2) is formed on the light-receiving surface of the light receiving element array 12.

If a plurality of light receiving element groups 14 disposed in close proximity to one another output light reception data uniformly indicating a gradual change (or indicating hardly any change), the body control device 101 determines that the subject 31 is a gradation subject with a gradation pattern. Subsequently, after generating a pair of signal strings, it directly executes an image shift detection operation without applying a high pass filter processing, which would normally be executed on the signal strings in order to remove an excess low-frequency component. In addition, if the difference between the high signal level and the low signal level in the pair of signal strings having been generated is less than a predetermined value, it determines that the subject 31 is a low contrast subject, requiring improved accuracy in the image shift detection operation and, accordingly, it generates a pair of signal strings by sampling data from a greater number of light receiving elements. For instance, it may generate a pair of signal strings by calculating the sum of the outputs from six light receiving elements instead of the sum of outputs from three light receiving elements as shown in FIG. 4(a).

As described above, the body control device 101 in the embodiment customizes the details of the focus detection operation so as to execute focus detection operation best suited for the specific pattern of the image formed via the micro-lenses 13 onto the light receiving element array 12. As explained earlier, the body control device 101 recognizes three different patterns (a cyclical pattern, an edge pattern and a gradation pattern) such as those shown in FIG. 7(a1) through FIG. 7(c1) through a pattern matching operation of the known art. There are no restrictions imposed with regard to the manner with which the pattern matching operation is executed, as long as at least these three patterns can be recognized through the operation.

Description of Focus Adjustment Control

FIG. 8 presents a flowchart of focus adjustment control executed by the body control device 101. The processing shown in FIG. 8 is included in a control program read out from a memory (not shown) and executed by the body control device 101.

First, in step S100, the body control device 101 makes a decision as to whether or not the user has performed a specific focus adjustment operation (e.g., halfway press operation at the shutter release switch). Until the user performs a focus adjustment operation, the body control device 101 repeatedly executes step S100 and once a focus adjustment operation is executed, the operation proceeds to step S110. In step S110, the body control device 101 executes charge control of the light receiving element array 12 and then, in step S120, it reads out the light reception outputs from the individual light receiving element groups 14. In step S130, the body control device 101 executes light perception pattern recognition processing (to be described later) based upon the light reception outputs having been read out and recognize a pattern that may be one of those shown in FIG. 7(a1) through FIG. 7(c1).

In step S140, the body control device 101 executes an image shift detection operation and a conversion operation by reflecting the light reception pattern recognition results in the details thereof in conjunction with part of the light reception outputs having been read out in step S120, and calculates a defocus quantity through these operations. In step S150, it calculates a drive quantity representing the extent to which the focusing lens 203 needs to be driven to achieve a focus match based upon the defocus quantity. In step S160, a decision is made as to whether or not the focusing lens 203 needs to be driven, i.e., whether or not a focus match state has already been achieved, and if the current condition is already a focus match state, the processing in FIG. 8 ends. If a focus match state has not been achieved, the operation proceeds to step S170, in which the body control device 101 executes lens drive control before the operation returns to step 110. The body controls device 101 executing the lens drive control transmits a drive instruction to the lens control device 201 so that the focusing lens 203 is driven by an extent corresponding to the lens drive quantity having been calculated in step S150. In response to this drive instruction, the lens control device 203 engages the lens drive device 206 in operation to drive the focusing lens 203.

Figure 9:
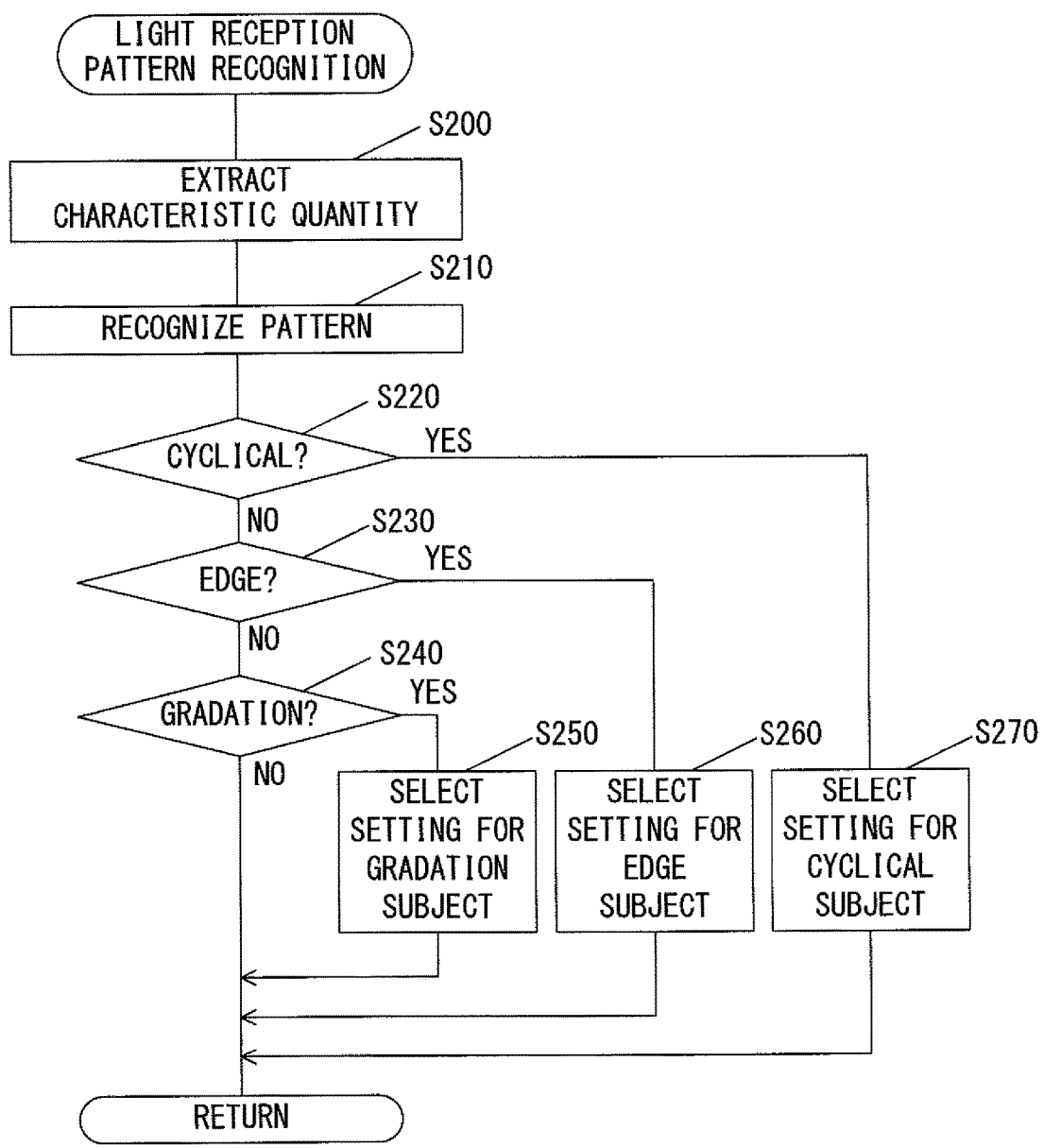

FIG. 9 presents a flowchart of the light reception pattern recognition processing called up in step S130 in FIG. 8. As is the processing shown in FIG. 8, this processing is included in the control program executed by the body control device 101. First, in step S200, the body control device 101 extracts a characteristic quantity pertaining to the image projected via the micro-lenses 13 based upon the light reception outputs from the individual light receiving element groups 14. The characteristic quantity is determined in correspondence to a color, a shape, a height, a position, a width, an area and the like pertaining to the image, and no restrictions whatsoever are imposed with regard to the characteristic quantity as long as it enables recognition of at least three different types of patterns such as those shown in FIG. 7(a1) through FIG. 7(c1). In the following step S210, the body control device 101 recognizes a pattern based upon the extracted characteristic quantity.

In step S220, the body control device 101 makes a decision as to whether or not the recognized pattern is a cyclical pattern. Upon deciding that a cyclical pattern has been recognized, the operation proceeds to step S270 to select the focus detection/focus adjustment setting for a cyclical subject. Namely, a setting whereby a defocus quantity, the absolute value of which is less than a predetermined threshold value (i.e., indicating a focus match state) is determined to be incorrect (i.e., the current condition is a false focus match state) is selected. Upon deciding that the defocus quantity is incorrect (the current condition is a false focus match state), the body control device 101 re-executes the focus detection calculation by narrowing the angle of detection range.

If a cyclical pattern has not been recognized, the operation proceeds to step S230 to make a decision as to whether or not the recognized pattern is an edge pattern. If an edge pattern has been recognized, the operation proceeds to step S260, in which the focus detection/focus adjustment setting for an edge subject is selected. Namely, a pair of signal strings to be used for purposes of image shift detection operation is generated by sampling data output from light receiving element groups 14 set in a single row running perpendicular to the direction in which the detected edge runs. In addition, the light receiving element groups 14, the outputs from which are to be sampled in order to generate the pair of signal strings, are selected from a narrower range than normal, so as to reduce the length of the signal strings relative to the regular signal string length.

If an edge pattern has not been recognized, the operation proceeds to step S240 to make a decision as to whether or not the recognized pattern is a gradation pattern. If a gradation pattern has been recognized, the operation proceeds to step S250, in which the focus detection/focus adjustment setting for a gradation subject is selected. Namely, once a pair of signal strings has been generated, an image shift detection operation is executed without applying a high pass filter to the signal strings. In addition, if the difference between the high signal level and the low signal level in the pair of signal strings having been generated is less than a predetermined value, the subject 31 is judged to be a low contrast subject requiring improved accuracy in the image shift detection operation, and accordingly, a pair of signal strings is generated by sampling data from a greater number of light receiving elements.

The camera system in the first embodiment described above achieves the following advantages.

(1) Based upon the light reception outputs from light receiving element groups 14, each disposed on the rear side of one of a plurality of micro-lenses 13 disposed in a two-dimensional array and each made up with a plurality of light receiving elements, the body control device 101 recognizes the pattern of a subject image formed via the plurality of micro-lenses 13 onto the light-receiving surface of the light receiving element array 12, and executes focus adjustment optimal for the recognized pattern by detecting the phase difference between a pair of light fluxes having passed through different areas of the photographic optical system based upon light reception outputs provided from the light receiving element array 12. As a result, accurate and efficient focus adjustment optimal for the subject pattern is enabled.

(2) After recognizing a cyclical pattern, the body control device 101 determines that the current condition is a false focus match state, even if a focus match state is detected, and re-executes the focus detection operation by narrowing the angle of detection range. Through these measures, accurate and efficient focus adjustment is enabled even when the subject has, for instance, a striped pattern, which tends to readily cause a false focus match.

(3) Upon recognizing an edge pattern, the body control device 101 selects fewer than usual light receiving element groups 14 from light receiving element groups 14 set consecutively in a single row running perpendicular to the detected edge, and generates a pair of signal strings to be used for purposes of image shift detection operation, by sampling outputs from the selected light receiving element groups 14. Through these measures, accurate and efficient focus adjustment is achieved for a subject with a clearly defined edge by excluding any influence of noise and the like present in areas other than the edge area. In addition, since signal strings that are shorter than normal are used, the focus detection operation can be executed at higher speed.

(4) Upon recognizing a gradation pattern, the body control device 101 generates a pair of signal strings and then immediately executes an image shift detection operation without applying a high pass filter to the signal strings. In addition, if the difference between the high signal level and the low signal level in the pair of signal strings having been generated is less than a predetermined value, it decides that the subject 31 is a low contrast subject requiring improved accuracy in the image shift detection operation and accordingly, generates a pair of signal strings by sampling outputs from a greater number of light receiving elements. Through these measures, accurate and efficient focus adjustment is achieved for a subject such as a gradation subject for which focus detection cannot be easily executed.

Second Embodiment

The camera system in this embodiment adopts a structure identical to that of the camera system achieved in the first embodiment shown in FIG. 1. The second embodiment only differs from the first embodiment in the focus detection processing executed by the body control device 101. The following explanation will focus on the feature of the current embodiment distinguishing it from the first embodiment, and a repeated explanation of other aspects of the embodiment similar to those of the first embodiment will not be provided.

Figure 10:
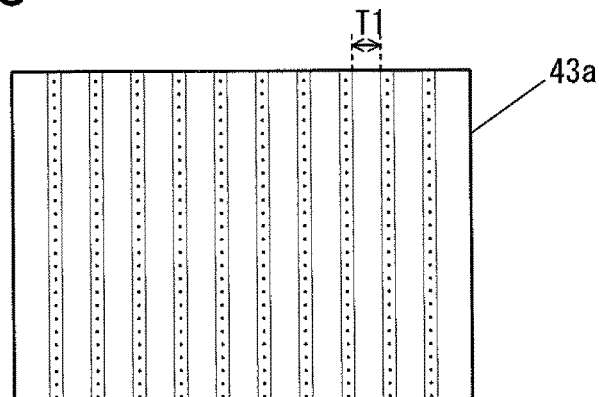
Figure 10:
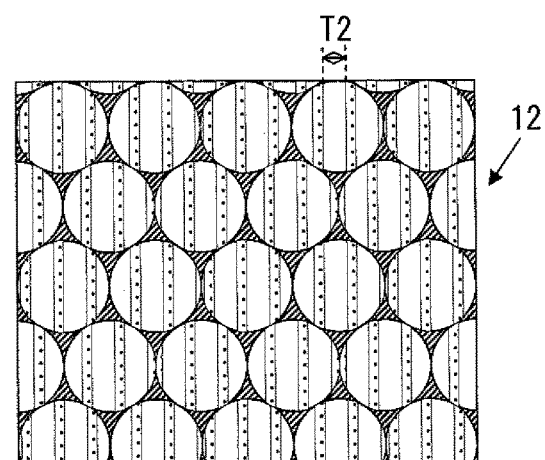
Figure 10:
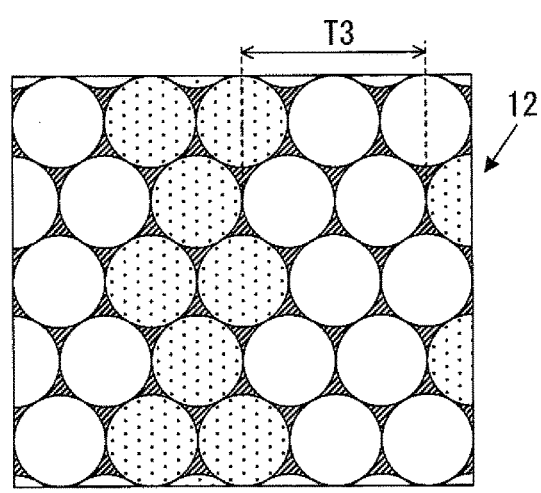

FIG. 10(*a*) shows a subject image 43*a* with vertical stripes running along the up-down direction. The vertical stripes in the subject image 43*a* are set over cycles T1 along the lateral direction, thereby achieving a cyclical pattern. When the subject image 43*a* is formed at a position somewhat set apart from the predetermined focal plane 17, the cyclical pattern shown in FIG. 10(*b*) is formed onto the light-receiving surface of the light receiving element array 12. By executing the pattern matching processing explained earlier on the light reception outputs from the light receiving element array 12, the body control device 101 recognizes the cyclical pattern such as that shown in FIG. 10(*a*) of the subject 31. The body control device 101, having recognized such a cyclical pattern, decides in the subsequent focus detection operation that any defocus quantity, the absolute value of which is less than a predetermined threshold value (i.e., indicating a focus match state), is incorrect (i.e., the current condition is a false focus match state).

Upon deciding that the defocus quantity is incorrect (i.e., the current condition is a false focus much state), the body control device 101 engages the lens drive device 203 in operation so as to drive the focusing lens 203 by a specific extent along the direction in which the cycles of the cyclical pattern having been recognized are lengthened and then re-executes the focus detection operation. For instance, if the current false focus match state results from focus adjustment having been executed by driving the focusing lens 203 along the direction toward infinity, it will drive the focusing lens 203 along the opposite direction (toward close-up). Through these measures, the cyclical pattern with the cycles T2 shown in FIG. 10(*b*) is altered to a cyclical pattern shown in FIG. 10(*c*) with cycles T3, longer than the cycles T2.

Description of Focus Adjustment Control

FIG. 11 presents a flowchart of the focus adjustment control executed by the body control device 101. The processing shown in FIG. 11 is included in a control program read out from a memory (not shown) and executed by the body control device 101.

First, in step S300, the body control device 101 makes a decision as to whether or not the user has performed a specific focus adjustment operation (e.g., a halfway press operation at the shutter release switch). Until the user performs a focus adjustment operation, the body control device 101 repeatedly executes step S300 and once a focus adjustment operation is executed, the operation proceeds to step S310. In step S310, the body control device 101 executes charge control of the light receiving element array 12 and then, in step S320, it reads out the light reception outputs from the individual light receiving element groups 14.

In step S330, the body control device 101 executes an image shift (phase difference) detection operation and a conversion operation in conjunction with part of the light reception outputs having been read out in step S320 and calculates a defocus quantity through these operations. Then, in step S360, a decision is made as to whether or not the focusing lens 203 needs to be driven, i.e., whether or not the current condition is already a focus match state, and if it is decided that a focus match state has already been achieved, the operation proceeds to step S350. If, on the other hand, it is decided that a focus match state has not been achieved, the operation proceeds to step S370 to calculate a drive quantity representing the extent to which the focusing lens 203 needs to be driven to achieve a focus match, based upon the defocus quantity having been calculated. The body control device 101 then executes lens drive control before the operation returns to step S310. The body control device 101 executing the lens drive control transmits a drive instruction to the lens control device 201 so that the focusing lens 203 is driven by an extent corresponding to the lens drive quantity having been calculated in step S370. In response to this drive instruction, the lens control device 203 engages the lens drive device 206 in operation to drive the focusing lens 203.

In step S350, the body control device 101 executes the false focus match decision-making processing to be described later. In step S360, a decision is made as to whether or not a false focus match has been detected. If it is decided that a false focus match has not been detected, the current condition is a true focus match state and, accordingly, the processing shown in FIG. 11 ends. If, on the other hand, it is decided that a false focus match has been detected, the operation proceeds to step S390, in which the body control device 101 determines the direction along which the focusing lens 203 needs to be driven in order to lengthen the cycles of the cyclical pattern formed on the light receiving element array 12.

For instance, if, following the start of the processing shown in FIG. 11, the operation has proceeded to step S390 after deciding, in step S340, that the current condition is not a focus match state, and accordingly, driving the focusing lens 203 so as to achieve a focus match state, "the drive direction along which the cycles of the cyclical pattern are lengthened" is the direction opposite from the direction in which the focusing lens 203 has been driven.

It is to be noted that if, following the start of the processing in FIG. 11, the operation has proceeded to step S390 without driving the focusing lens 203 even once, the focusing lens 203 should first be driven along a specific direction and then the cycles in the cyclical pattern should be checked to determine if the cycles have been lengthened. At this time, if the cycles have been shortened, the focusing lens 203 should be driven along the direction opposite from the direction in which the focusing lens 203 was initially driven and thus, it is possible that the focusing lens 203 should be driven along the "drive direction along which the cycles of the cyclical pattern are lengthened".

In step S395, the body control device 101 executes drive control for the focusing lens 203 so as to drive the focusing lens 203 by a specific extent along the particular direction having been determined in step S390. In more specific terms, it transmits a drive instruction to the lens control device 201 so as to drive the focusing lens 203 by a specific extent along the direction. Subsequently, the operation returns to step S310 to repeatedly execute the processing starting with the charge control for the light receiving element array 12.

Figure 12:
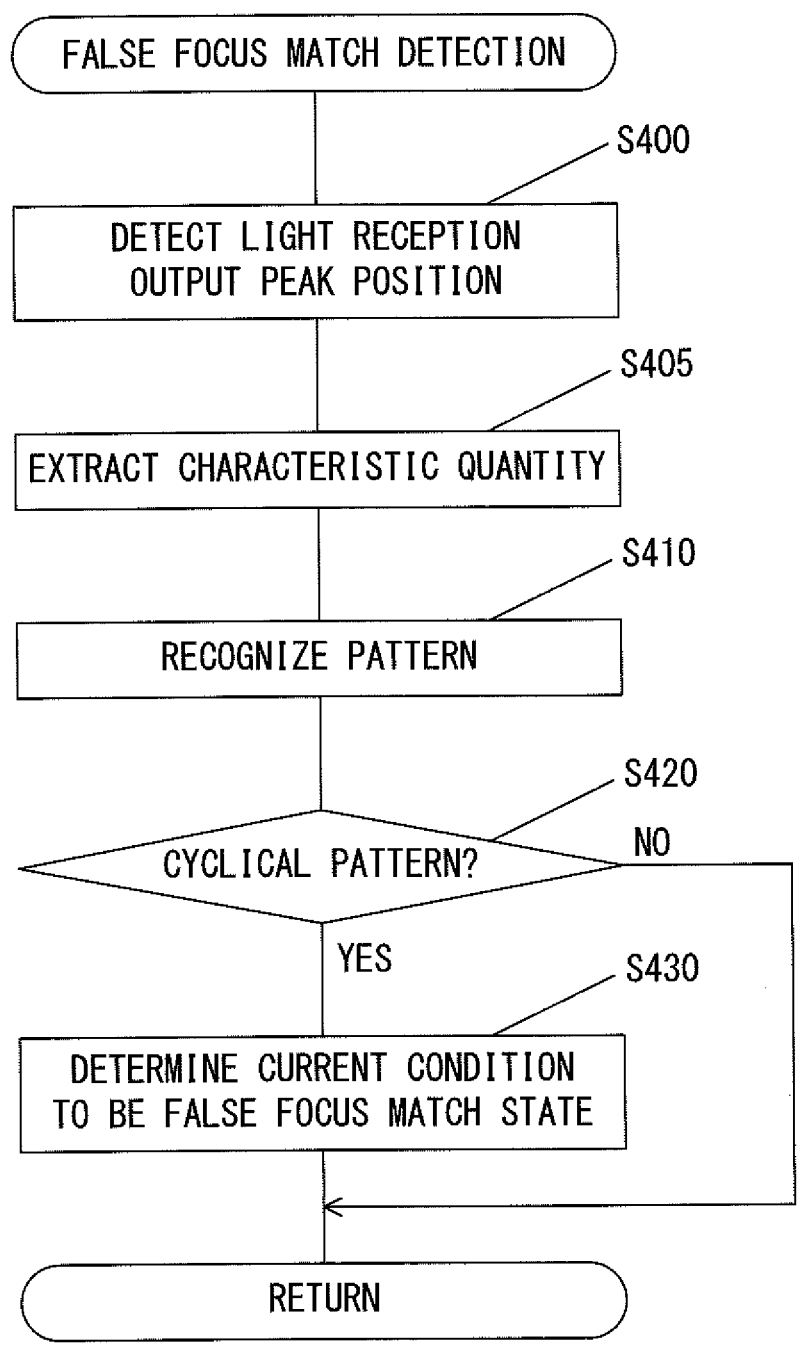

FIG. 12 presents a flowchart of the false focus match detection processing called up in step S350 in FIG. 11. As is the processing shown in FIG. 11, this processing is included in the control program executed by the body control device 101. First, in step S400, the body control device 101 detects the light receiving element achieving the greatest light reception output (i.e., the peak position in the light reception outputs) among the various light receiving elements having been used in the phase difference detection in step S330 in FIG. 11. In the following step S405, the body control device 101 extracts a characteristic quantity pertaining to the image having been projected via the corresponding micro-lens 13 from the light reception outputs from the light receiving element group 14 (the light receiving element group 14 covered by the micro-lens 13 that covers the light receiving element) to which the light receiving element, having been detected in step S400 belongs. The characteristic quantity is determined in correspondence to a color, a shape, a height, a position, a width, an area and the like pertaining to the image, and no restrictions whatsoever are imposed with regard to the characteristic quantity as long as it enables recognition of at least a cyclical pattern such as that shown in FIG. 10(b). In the following step S410, the body control device 101 recognizes the cyclical pattern based upon the extracted characteristic quantity.

In step S420, the body control device 101 makes a decision as to whether or not a cyclical pattern has been recognized. Upon deciding that a cyclical pattern has been recognized, the operation proceeds to step S410 to decide that the current condition is a false focus match state. In other words, it is decided that the defocus quantity, having been calculated in step S330 in FIG. 11, is not correct.

The camera system in the second embodiment described above achieves the following advantages.

(1) Based upon the light reception outputs from light receiving element groups 14, each disposed on the rear side of one of a plurality of micro-lenses 13 disposed in a two-dimensional array and each made up with a plurality of light receiving elements, the body control device 101 recognizes the pattern of a subject image formed via the plurality of micro-lenses 13 onto the light-receiving surface of the light receiving element array 12, and executes focus adjustment optimal for the recognized pattern by detecting the phase difference between a pair of light fluxes having passed through different areas of the photographic optical system based upon light reception outputs provided from the light receiving element array 12. As a result, accurate and efficient focus adjustment optimal for the subject pattern is enabled.

(2) After recognizing a cyclical pattern, the body control device 101 determines that the current condition is a false focus match state, even if a focus match state is detected, and re-executes the focus detection operation by narrowing the angle of detection range. Through these measures, accurate and efficient focus adjustment is enabled even when the subject has, for instance, a striped pattern, which tends to readily cause a false focus match.

(3) Upon recognizing an edge pattern, the body control device 101 selects fewer than usual light receiving element groups 14 from light receiving element groups 14 set in a single row running perpendicular to the detected edge, and generates a pair of signal strings to be used for purposes of image shift detection operation, by sampling outputs from the selected light receiving element groups 14. Through these measures, accurate and efficient focus adjustment is achieved for a subject with a clearly defined edge by excluding any influence of noise and the like present in areas other than the edge area. In addition, since signal strings that are shorter than normal are used, the focus detection operation can be executed at higher speed.

(4) Upon recognizing a gradation pattern, the body control device 101 generates a pair of signal strings and then immediately executes an image shift detection operation without applying a high pass filter to the signal strings. In addition, if the difference between the high signal level and the low signal level in the pair of signal strings having been generated is less than a predetermined value, it decides that the subject 31 is a low contrast subject requiring improved accuracy in the image shift detection operation and accordingly, generates a pair of signal strings by sampling outputs from a greater number of light receiving elements. Through these measures, accurate and efficient focus adjustment is achieved for a subject such as a gradation subject for which focus detection cannot be easily executed.

The following variations are also within the scope of the present invention, and any one of or a plurality of the variations may be adapted in combination with either of the embodiments.

Variation 1

While five light receiving element groups 14a through 14c, taking up consecutive positions along the lateral direction, are selected for purposes of focus detection in the example described in reference to FIG. 3, focus detection may be executed by using light receiving element groups 14 set side-by-side in a single row running along a different direction. In addition, more or fewer than five light receiving element groups 14 may be selected and it is not strictly necessary to select consecutive light receiving element groups 14. For instance, light receiving element groups 14 disposed at every second position may be selected.

Variation 2

Instead of re-executing the focus detection operation by narrowing the angle of detection range upon deciding that the current condition is a false focus match state after recognizing a cyclical pattern, the direction in which the focusing lens 203 is driven may be reversed. For instance, if it is decided that the current condition is a false focus match state after or while the focusing lens 203 is driven toward the close-up position, focus detection may be re-executed by driving the focusing lens 203 toward the infinity position.

Variation 3

The patterns recognized by the body control device 101 in the embodiments described above, i.e., a cyclical pattern, an edge pattern and a gradation pattern, are examples and the body control device 101 may recognize another pattern and execute focus detection operation and focus adjustment control optimal for the particular pattern. In addition, the body control device 101 may recognize a cyclical pattern only or an edge pattern only.

Variation 4

The present invention may be adopted in conjunction with a micro-lens array 11 and a light receiving element array 12 different from those shown in FIG. 2. For instance, the micro-lenses 13 and the light receiving element groups 14 may be arrayed with array patterns different from those shown in FIG. 2. They may, for instance, be disposed in a square array pattern. In addition, the micro-lenses 13 may assume the shape other than the circular shape (e.g., a hexagonal shape). The light receiving elements constituting the light receiving element groups 14 may be disposed in a pattern other than the square array pattern. For instance, light receiving elements may be disposed so that the light receiving element groups 14 assume a shape better approximating the circular shape of the micro-lenses 13, or light receiving elements may be disposed in in a single lateral row or in a single longitudinal column. Furthermore, the light-blocking mask present between the micro-lenses 13 may be omitted.

Variation 5

Light receiving elements other than the three light receiving elements at the left end and the three light receiving elements at the right end of each light receiving element group shown in FIG. 4(a) may be selected and used when generating a pair of signal strings for purposes of focus detection. In addition, it is not strictly necessary that sums of pixel values be calculated. Namely, while the values a(1), a(2) and the like are each calculated by adding up the light reception outputs from three light receiving elements in the example presented in FIG. 4(a), the light reception output from a single light receiving element may instead be designated as a(1), a(2) or the like.

Variation 6

The current condition may be determined to be a false focus match state if it is decided, through focus detection executed after recognizing a pattern other than a cyclical pattern, that a focus match has been achieved. It is because a uniform image is bound to be formed on the rear side of a single micro-lens 13, as illustrated in FIG. 5(c) in a true focus much state.

Variation 7

A cyclical pattern may be recognized through a method other than the pattern matching method described earlier. For instance, a cyclical pattern may be recognized by detecting, via a single light receiving element group 14 covered by a given micro-lens 13, edges that run along a specific direction (e.g., the lateral direction, the longitudinal direction or a diagonal direction) in the light reception outputs from the light receiving element group. The term "edge" in this context refers to a point at which the light reception outputs of two adjacent light receiving elements indicate a significant change (exceeding a predetermined threshold value). In this situation, the intervals between the edges that are detected represent the pattern cycles.

In addition, a cyclical pattern may be recognized by calculating the sums of outputs, each in correspondence to one of a plurality of light receiving element groups 14, which, in turn, are each covered by one of a plurality of micro-lenses 13 disposed along a specific direction, and comparing the plurality of sums thus calculated. When the photographic optical system is in a focus match state, the rear surface of a given micro-lens 13 is uniformly irradiated with light as shown in FIG. 5(c). This means that if the subject image assumes a cyclical pattern, the difference between the sums of the outputs from two light receiving element groups 14 set next to each other is bound to be large, as shown in FIG. 10(c). Namely, an edge can be detected based upon the sums of the outputs from two adjacent light receiving element groups 14. In a false focus much state, in contrast, a cyclical pattern is formed on the rear surface of each micro-lens 13 and in such a case, the difference between the sums of the outputs from two adjacent light receiving element groups 14 is bound to be relatively small. Thus, by adding up the light reception outputs from each light receiving element group 14 and detecting edges through comparison of the sums of the outputs each corresponding to a light receiving element group 14, a cyclical pattern can be recognized.

Variation 8

The present invention may be adopted in a camera, widely known as a single lens reflex camera, that includes a quick return mirror. The quick return mirror in the single lens reflex camera adopting the present invention should be configured by disposing a sub mirror at the rear surface of a quick return mirror so as to ensure that part of the subject light having entered the quick return mirror is transmitted through the quick return mirror and enters the sub mirror, and that the subject light reflected at the sub mirror enters the focus detection unit 104. In addition, the present invention may be adopted in conjunction with an image sensor 102 configured with a micro-lens array 11 and a light receiving element array 12, as is the focus detection unit 104, and in such a case, focus detection and still image capturing may both be executed via the light receiving element array 12 in the image sensor 102.

Variation 9

The lens drive device 206 and the aperture drive device 207 may be disposed at the camera body 100 instead of at the interchangeable lens 200. In such a configuration, the actuators (not shown) in the lens drive device 206 and aperture drive device 207 will adopt structures that allow the drive forces imparted thereby to be respectively transmitted to the focusing lens 203 and the aperture 205 in the interchangeable lens 200 via drive mechanisms (not shown).

As long as the features characterizing the present invention are not compromised, the present invention is in no way limited to the particulars of the embodiments described above, and other modes that are conceivable within the technical scope of the present invention are also within the scope of the invention.

The disclosures of the following priority applications are herein incorporated by reference:
Japanese Patent Application No. 2012-100150 filed Apr. 25, 2012
Japanese Patent Application No. 2012-158796 filed Jul. 17, 2012

EXPLANATION OF REFERENCE NUMERALS

1 . . . camera, 100 . . . camera body, 101 . . . body control device, 102 . . . image sensor, 103 . . . half mirror, 104 . . . focus detection unit, 106 . . . eyepiece lens, 108 . . . electronic viewfinder unit, 110 . . . monitor, 200 . . . interchangeable lens, 201 . . . lens control device, 202, 204 . . . lens, 203 . . . focusing lens, 205 . . . aperture, 206 . . . lens drive device, 207 . . . aperture drive device

What is claimed is:

1. A detection device, comprising:
a light receiving unit that comprises a micro-lens and a plurality of light receiving elements that receive light transmitted through an optical system and the micro-lens and outputs a signal; and
a controller that includes a processor and executes:
detecting, based upon the signal outputted by the plurality of the light receiving elements, an offset quantity between a position at which an image is formed by the optical system and the light receiving unit; and
changing, based upon the signal outputted by the plurality of the light receiving elements, at least one of a position and a number of the light receiving elements to be used for detecting the offset quantity.

2. The detection device according to claim 1, wherein the controller executes changing at least one of the position and the number of the light receiving elements, in case that (1) the offset quantity is less than a first threshold value, (2) signals outputted by the plurality of light receiving elements are inversed, (3) a change of the signal outputted by the plurality of light receiving elements is equal to or more than a second threshold value, or (4) a change of the signal outputted by the plurality of light receiving elements is less than a third threshold value.

3. The detection device according to claim 1, wherein the controller executes changing a position of the light receiving elements to be used for detecting the offset quantity, in case that the offset quantity is less than a first threshold value.

4. The detection device according to claim 3, wherein the controller executes changing the light receiving element to be used for detecting the offset quantity to a light receiving element disposed at a position close to a light axis of the optical system, in case that the offset quantity is less than the first threshold value.

5. The detection device according to claim 1, wherein the controller executes changing the number of the light receiving elements to be used for detecting the offset quantity, in case that the signals outputted by the plurality of light receiving elements are inversed or a change of the signal outputted by the plurality of light receiving elements is equal to or more than a second threshold value.

6. The detection device according to claim 5, wherein the controller executes decreasing the number of the light receiving elements to be used for detecting the offset quantity, in case that the signals outputted by the plurality of light receiving elements are inversed or a change of the signal outputted by the plurality of light receiving elements is equal to or more than a second threshold value.

7. The detection device according to claim 1, wherein the controller executes changing the number of the light receiving elements to be used for detecting the offset quantity, in case that a change of the signal outputted by the plurality of light receiving elements is less than a third threshold value.

8. The detection device according to claim 7 wherein the controller executes increasing the number of the light receiving elements to be used for detecting the offset quantity, in case that a change of the signal outputted by the plurality of light receiving elements is less than a third threshold value.

9. The detection device according to claim 1, wherein the controller executes changing at least one of the position and the number of the light receiving elements, in case that the image formed by the optical system includes a cycle pattern, an edge pattern or a graduation pattern.

10. The detection device according to claim 9, wherein the controller executes changing a position of the light receiving elements to be used for detecting the offset quantity, in case that the image formed by the optical system includes the cycle pattern.

11. The detection device according to claim 9, wherein the controller executes changing the light receiving element to be used for detecting the offset quantity to a light receiving element disposed at a position close to a light axis of the optical system, in case that the image formed by the optical system includes the cycle pattern.

12. The detection device according to claim 9, wherein the controller executes changing the number of the light receiving elements to be used for detecting the offset quantity, in case that the image formed by the optical system includes the edge pattern.

13. The detection device according to claim 12, wherein the controller executes decreasing the number of the light receiving elements to be used for detecting the offset quantity, in case that the image formed by the optical system includes the edge pattern.

14. The detection device according to claim 9, wherein the controller executes changing s the number of the light receiving elements to be used for detecting the offset quantity, in case that the image formed by the optical system includes the graduation pattern.

15. The detection device according to claim 14, wherein the controller executes increasing the number of the light receiving elements to be used for detecting the offset quantity, in case that the image formed by the optical system includes the graduation pattern.

16. The detection device according to claim 1, wherein the controller executes matching an f-number of aperture included in the optical system for detecting the offset quantity to an f-number of the micro-lens.

17. The detection device according to claim 1, wherein the light receiving unit comprises a plurality of micro-lenses; and the plurality of the light receiving elements are disposed to each of the plurality of micro-lenses.

18. An imaging device, comprising:

the detection device according to claim 1; and a generation unit that includes a processor and executes generating image data based upon the signal outputted by the plurality of light receiving elements.

19. A detection device, comprising:

a light receiving unit that comprises a micro-lens and a plurality of light receiving elements that receive light transmitted through an optical system and the micro-lens and outputs a signal; and a controller that includes a processor and executes:

recognizing a pattern included in an image formed by the optical system based upon the signal outputted by the plurality of light receiving elements; and controlling a position of a focusing lens included in the optical system to a direction in which a cycle in the recognized pattern is lengthened.

* * * * *